United States Patent
Ensor et al.

(10) Patent No.: US 7,653,010 B2
(45) Date of Patent: Jan. 26, 2010

(54) SYSTEM AND METHOD FOR WIRELESS MESH NETWORKING

(75) Inventors: Tim Ensor, Cambridge (GB); Matthew Storkey, Cambridge (GB); Simon Shakespeare, Cambridge (GB); Edward Colby, Cambridge (GB)

(73) Assignee: Casient Limited, Cambridge (GB)

( * ) Notice: Subject to any disclaimer, the term of this patent is extended or adjusted under 35 U.S.C. 154(b) by 795 days.

(21) Appl. No.: 10/559,076

(22) PCT Filed: Jun. 2, 2004

(86) PCT No.: PCT/GB2004/002321

§ 371 (c)(1),
(2), (4) Date: May 8, 2006

(87) PCT Pub. No.: WO2004/107679

PCT Pub. Date: Dec. 9, 2004

(65) Prior Publication Data

US 2006/0245360 A1    Nov. 2, 2006

(30) Foreign Application Priority Data

Jun. 3, 2003 (GB) ................................. 0312674.5
Feb. 10, 2004 (GB) ................................. 0402917.9

(51) Int. Cl.
*H04L 12/28* (2006.01)
(52) U.S. Cl. ....................................... 370/255; 370/256
(58) Field of Classification Search ................. 370/248, 370/252, 255, 256, 351, 386, 389, 392, 395.3, 370/395.32, 395.54, 400
See application file for complete search history.

(56) References Cited

U.S. PATENT DOCUMENTS

| | | | | |
|---|---|---|---|---|
| 5,216,423 A * | 6/1993 | Mukherjee | ................ | 341/79 |
| 5,875,301 A * | 2/1999 | Duckwall et al. | ............... | 710/8 |
| 6,216,168 B1 * | 4/2001 | Dev et al. | .................. | 709/245 |
| 6,415,279 B1 * | 7/2002 | Gard et al. | ..................... | 707/2 |
| 6,859,455 B1 * | 2/2005 | Yazdani et al. | ............. | 370/392 |
| 6,874,033 B1 * | 3/2005 | Sugai et al. | ................ | 709/238 |
| 7,269,821 B2 * | 9/2007 | Sahinoja et al. | ............ | 717/106 |
| 2002/0009056 A1 * | 1/2002 | Kanehara | .................... | 370/255 |

* cited by examiner

*Primary Examiner*—Brenda Pham
(74) *Attorney, Agent, or Firm*—McDermott Will & Emery LLP (57) ABSTRACT

According to an embodiment of the invention, there is disclosed a method of operating a wireless mesh network. The method comprises: seeding the network from a first node; allocating a network address to each member node of the network to form a tree-like structure of the nodes, such that the network address is reversibly derived from the network address of the member node from which it is derived in the tree-like structure; and mapping out cross-branch network connections between nodes that are determined not to be immediate neighbour nodes according to the addresses of the tree-like structure. Further related system embodiments are also disclosed.

22 Claims, 4 Drawing Sheets

SYSTEM AND METHOD FOR WIRELESS MESH NETWORKING

RELATED APPLICATION

This application is the U.S. National Phase under 35 U.S.C. §371 of International Application No. PCT/GB2004/002321, filed Jun. 2, 2004, which in turn claims the benefit of Great Britain Application No. 0312674.5, filed Jun. 3, 2003, and Great Britain Application No. 0402917.9, filed Feb. 10, 2004, the disclosures of which Applications are incorporated by reference herein in their entirety.

TECHNICAL FIELD

This invention relates to wireless mesh networks, and in particular to such networks that may be used to form a building lighting control system; and to wirelessly enabled handheld equipment, and management interface software, for managing the building control system; and to wireless mesh networks and management systems for a variety of other applications.

BACKGROUND

In a wireless mesh network, each node communicates directly only with neighbouring nodes, which in turn relay transmissions to more distant nodes. Such networks find application in a variety of different fields, differing based on the type of digital devices found at each node. For example, such networks may be used for controlling lights in an office building, with each light device being connected to a node of the network and communicating wirelessly with neighbouring nodes; or for communicating between a network of water sensor devices at a water purification plant, or for communicating between members of a wireless network of computer systems. The low power requirements of wireless communications to a neighbouring node, for example when each node is only a few meters distant from neighbouring nodes, mean that mesh networks can be made using relatively inexpensive transceivers.

U.S. Pat. No. 6,028,857 of Poor identifies several types of prior art mesh networks. In a first type of mesh network, the Link State Routing system, each node maintains a routing table that specifies an optimal path toward each network destination. An originating node sends a message by broadcast to all neighbouring nodes, but only the specified recipient node along the optimal path relays the message, as determined by each node consulting its routing table; until the message reaches its destination. In a second type of mesh network, the Source Path Routing system, the originating node sends a message containing the entire route of the message; each node then passes the message along the specified route until the destination node is reached.

Both of these types of wireless mesh network require that each node keep a record of its neighbouring nodes, and broadcasts changes in its list of neighbouring nodes. Among other things, the use of these messages consumes bandwidth and power, and risks breakdown due to errors in transmitting the updated neighbour lists.

In the technique of U.S. Pat. No. 6,028,857 of Poor, each member node of the mesh network maintains a cost table that indicates the costs of transmission to other nodes in the network. These cost tables are dynamically generated, based on the number of "hops" required to transmit messages from an originating node to a destination node. New nodes may therefore be added to the network quite flexibly, simply by having the node transmit a message; and node locations may be changed by simply changing the nodes' locations, and beginning to transmit messages. There is no requirement for each node to maintain a routing list of network neighbours, or to transmit updates to the list of neighbouring nodes.

However, there is an ongoing need for wireless mesh networks with low power requirements, which can quickly determine the lowest cost transmission route from an originating node to a destination node.

SUMMARY

In accordance with an embodiment of the invention, there is disclosed a method of operating a wireless mesh network, the method comprising: seeding the network from a first node; allocating a network address to each member node of the network to form a tree-like structure of nodes, such that the network address is reversibly derived from the network address of the member node from which it is derived in the tree-like structure; and mapping out cross-branch network connections between nodes that are determined not to be immediate neighbour nodes according to the addresses of the tree-like structure.

In a related embodiment, each node of the network may respond to the same predetermined maximum number of requests to join the network from other potential member nodes. Each network address for each new node of the network may be derived from a network address of a member node that responds to the new node's request to join the network. Cross-branch network connections may be formed by: (i) each node of the network periodically transmitting a discovery message; and (ii) when a second member node receives the discovery message, forming a cross-branch network connection between the second member node and a node that sent the discovery message. The method may further comprise re-allocating the network addresses of the nodes of the network such that no node of the network has a network connection with another node of the network that is in a generation of the tree-like structure that differs by more than one generation. The method may also further comprise determining a minimum number of nodes through which a message must be passed to be transferred from a source node to a destination node; and transferring the message from the source node to a neighbour node that has the smallest such minimum number of nodes.

In a further related embodiment, the network may comprise both battery-powered and mains-powered nodes, and the method may further comprise: operating at least one battery-powered node in a dormant state for at least a portion of time; and using a mains-powered node, associated with the at least one battery-powered node, to hold incoming information directed to the associated battery-powered node, until the battery-powered device becomes active again. Messages may be preferentially routed via the mains-powered nodes.

In another related embodiment, a single synchronization node of the network periodically transmits time synchronization messages throughout the network. Alternatively, each node of the network may maintain a record of a time offset between its own time standard and that of each of its neighbouring nodes.

In a further related embodiment, the method further comprises connecting at least one member node of the network to a computer device using a management interface. The computer device may gather information about the status of the network, or issue instructions to at least one node of the network, using the management interface. Instructions may be issued, using the management interface, to group at least two nodes of the network such that the grouped nodes store network addresses of fellow grouped nodes, and transmit a message to the fellow grouped nodes upon receipt of an external stimulus. At least one node of the grouped nodes may be capable of re-transmitting a message to all other member nodes of the grouped nodes.

In another related embodiment, at least one node of the network communicates with a device that is capable of converting messages from the network into a form suitable for transmission via an alternative protocol, which may be at least one of: Ethernet, the 802.11 Standard, HyperLAN, TCP/IP, GSM, GPRS, EDGE, or UMTS. Each node of the network may comprise a wireless transceiver, a microprocessor, and an external device. The external device may comprise a sensor, an actuator, or a general computing device; or a building lighting device. Each node may comprise components selected from at least one of: (i) a generic ISM band transceiver and a low power microprocessor; (ii) a device conforming to the Bluetooth standard 802.15.1; (iii) a device conforming to the ZigBee standard 802.15.4; and (iv) a device conforming to the WiFi standard 802.11.

In another embodiment according to the invention, there is disclosed a wireless network, the network comprising: a plurality of member nodes arranged in a treelike structure seeded from a first node, wherein each member node is allocated a network address that is reversibly derived from the network address of the member node from which it is derived in the tree-like structure; and at least one cross-branch connection between nodes of the network that are not immediate neighbour nodes according to the network addresses of the tree-like structure.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

In an embodiment according to the invention, there is disclosed a wireless mesh network in which a low-cost path for a message between two nodes of the network can be determined based on organizing the network into a tree structure, and discovering cross-branches between the nodes. The network is formed by an initialization process that starts from a central node, and continues by dynamically allocating network addresses to devices joining the network in a deterministic manner. Such a network may be used for a wide variety of purposes, including for implementing a building lighting control system.

Figure 1:
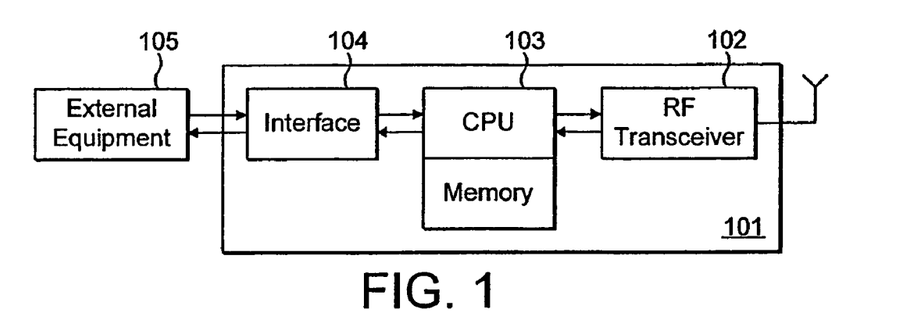
FIG. 1 shows the components of an individual node of a wireless mesh network, in accordance with an embodiment of the invention.

FIG. 1 shows the components of an individual node 101 of a wireless mesh network, in accordance with an embodiment of the invention. A radio frequency transceiver 102 transmits and receives messages to and from neighbouring nodes of the network; and communicates with a CPU/Memory module 103, which implements the processing logic required by each node of the network to implement the algorithms described herein. The CPU/Memory module 103 communicates with the external equipment 105 located at the node, via an interface module 104. The external equipment 105 may be any suitable device, such as a sensor, actuator, or general computing device; or a building lighting device; in accordance with embodiments of the invention.

Figure 2:
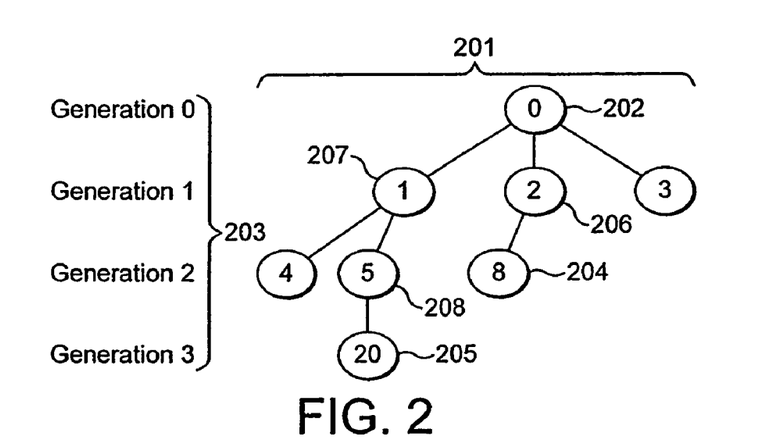
FIG. 2 shows a tree structure of nodes, determined in accordance with an embodiment of the invention.

FIG. 2 shows a tree structure of nodes 201, determined in accordance with an embodiment of the invention. The network 201 is formed by allocating addresses to new nodes, which sign on at random with nodes that already have network addresses. The process is "seeded" by starting at node 0, shown at 202. Addresses are allocated to new nodes using the algorithm of FIG. 6, described further below. The tree structure is organized into generations, such as generations 0 through 3, shown at 203. To route a message from node 8, shown at 204, to node 20, shown at 205, in the tree structure would take five hops, via nodes 2, 0, 1, and 5 (shown at 206, 202, 207, and 208, respectively), using the shortest distance algorithm of FIG. 4, described further below. In a case where a node has more than one neighbour node, such as node 1 (shown at 207) a message will be routed via one of the neighbour nodes by preference, using the shortest distance algorithm of FIG. 4 (for example, for node 1, the message will be routed via node 5, shown at 205).

Figure 3:
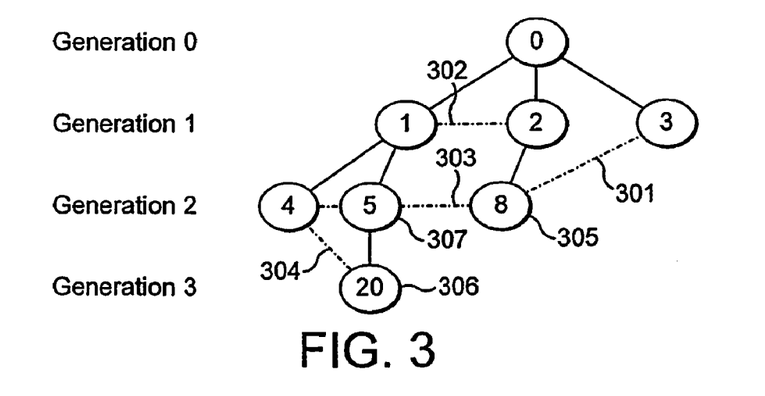
FIG. 3 shows a tree structure of nodes with cross-branches determined by a node discovery process, in accordance with an embodiment of the invention.

After organizing the network of nodes into a tree structure, as shown in FIG. 2, cross-branches in the tree structure are next determined using a node discovery process, in accordance with an embodiment of the invention, as shown in FIG. 3. The cross-branches 301-304 are formed via the discovery process, to allow nodes to communicate directly with nodes that are not directly related to them via the tree structure. The cross branches give the network its mesh structure. Using cross-branch 303, it only takes two hops to transmit a message from node 8 to node 20, via node 5 (shown at 305, 306, and 307 respectively), by applying the shortest distance algorithm of FIG. 4 at node 8. This algorithm will determine that node 5 is only one hop away from the destination node, whereas nodes 2 and 3 are each four hops away. Applying the shortest distance algorithm of FIG. 4 at node 5 indicates that node 20 is zero hops from the destination (i.e. it is the destination), whereas nodes 1 and 4 are one and two hops away, respectively.

Figure 4:
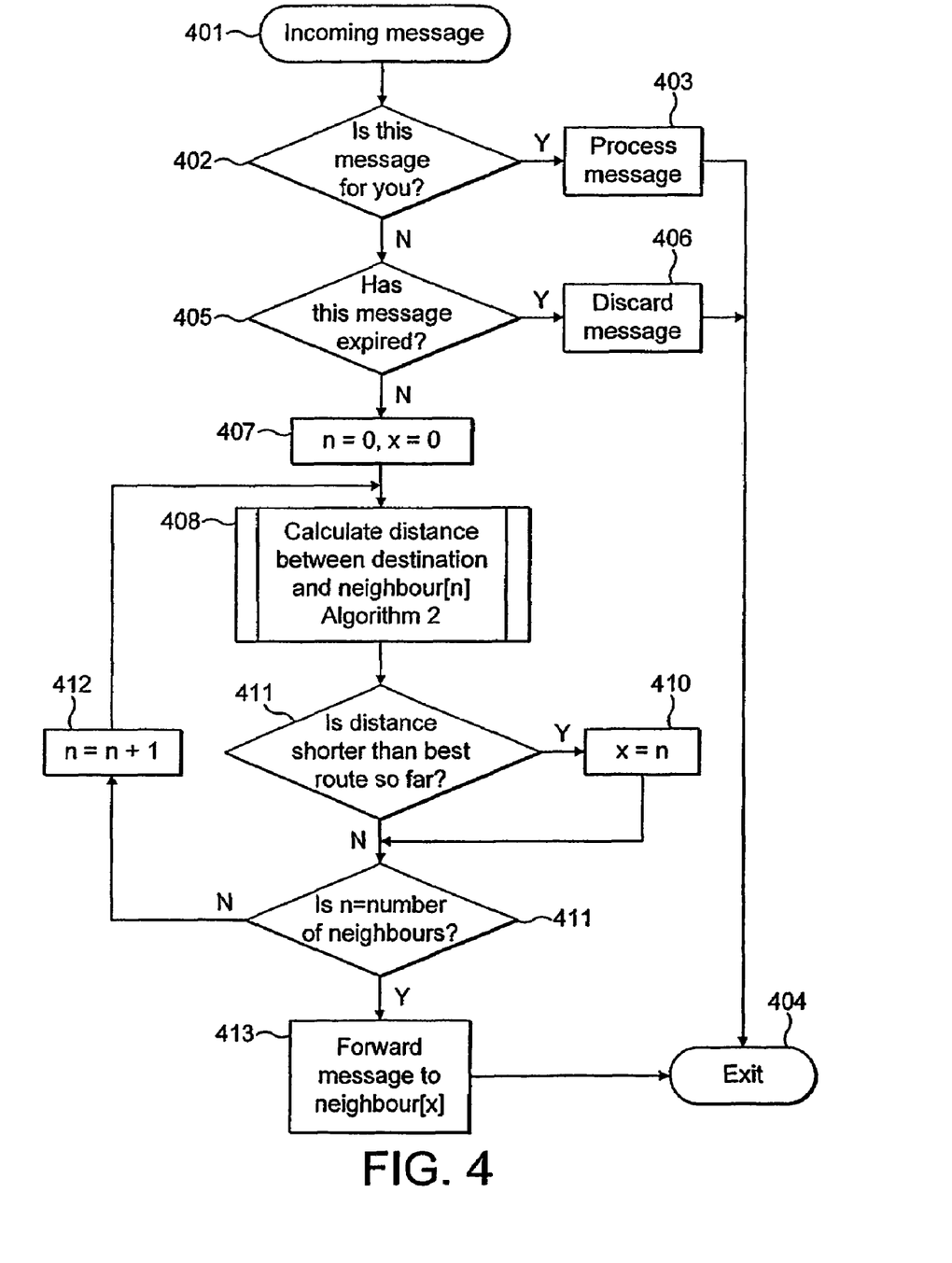
FIG. 4 shows an algorithm for determining the shortest distance between two nodes, in accordance with an embodiment of the invention.

FIG. 4 shows an algorithm for determining the shortest distance between two nodes, in accordance with an embodiment of the invention. When a node receives an incoming message 401, it first determines 402 whether the message is intended for itself; if so, it processes the message 403 and exits 404. If the message is not intended for this node, it is next determined whether the message has expired 405; if so, the message is discarded 406. If not, a loop is initiated by setting two variables 407 to zero, i.e. a neighbour index n is set to zero, and a shortest distance neighbour index x is set to 0. The loop proceeds by determining 408 the distance between each neighbour node and the destination node, using the algorithm of FIG. 5A, described below. If the distance for a given neighbour node is shorter 409 than the best route so far, the shortest distance neighbour index x is re-set 410 to equal that neighbour's node number. The loop is then repeated 411 for each of the neighbour nodes, by incrementing 412 the neighbour index n. Once all neighbours have been considered, the message is forwarded 413 to the neighbour having the shortest distance neighbour index x.

Figure 5A:
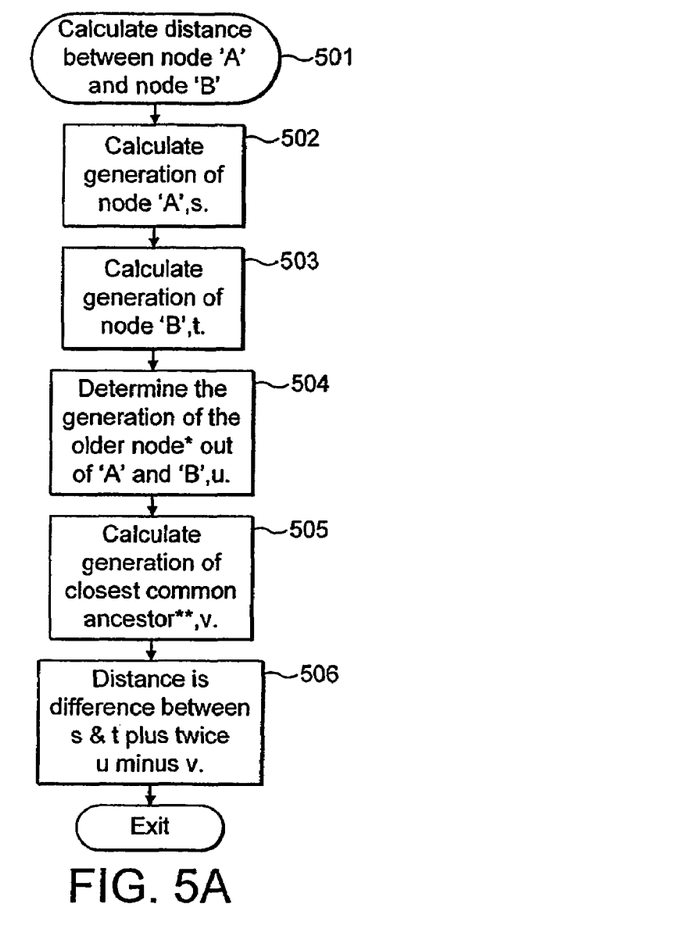
FIG. 5A shows an algorithm for determining the distance between two nodes based on the generation of each node in a tree structure, in accordance with an embodiment of the invention.
Figure 5B:
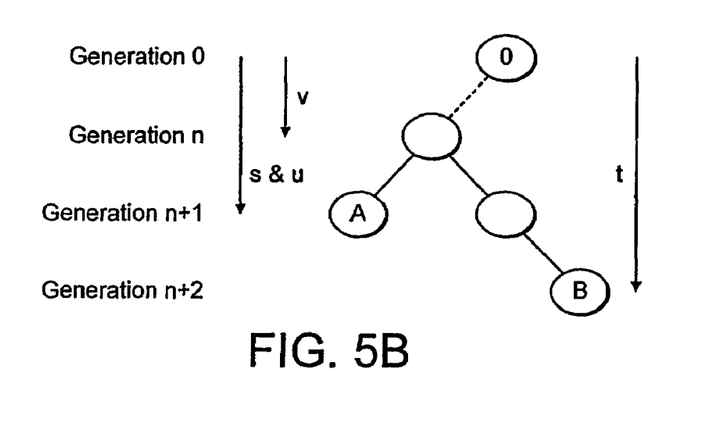
FIG. 5B shows a distance calculation in accordance with the embodiment of FIG. 5A.

FIG. 5A shows an algorithm for determining the distance between two nodes based on the generation of each node in a tree structure, in accordance with an embodiment of the invention. This algorithm is used to determine the distance from each neighbour node to the destination node, at step 409 of the loop of FIG. 4, and is discussed with reference to FIG. 5B. In order to calculate 501 the distance between node A and node B, the tree generation of node A, which is indicated as the length "s" in FIG. 5B, is first determined 502. Next, the tree generation of node B, which is indicated as the length "t" in FIG. 5B, is determined 503. Next, the generation of the older node out of nodes A and B, is determined 504, indicated as the value "u" in FIG. 5B; the "older" node is that node which is of a lower generation number. The generation of the closest common ancestor, v, is next determined 505. For example, in FIG. 2, the closest common ancestor between node 4 and node 20 is node 1; and the closest common ancestor between node 3 and node 1 is node 0. Finally, the distance between nodes A and B is determined 506, using the formula that the distance equals the absolute value of the difference between s and t, plus twice (u minus v), i.e. |s−t|+2(u−v). In the example of FIG. 5B, the distance from A to B is three hops, as calculated using the fact that the difference between s and t is 1, and twice (u minus v) is 2, so that the total is the three hops distance.

Figure 6:
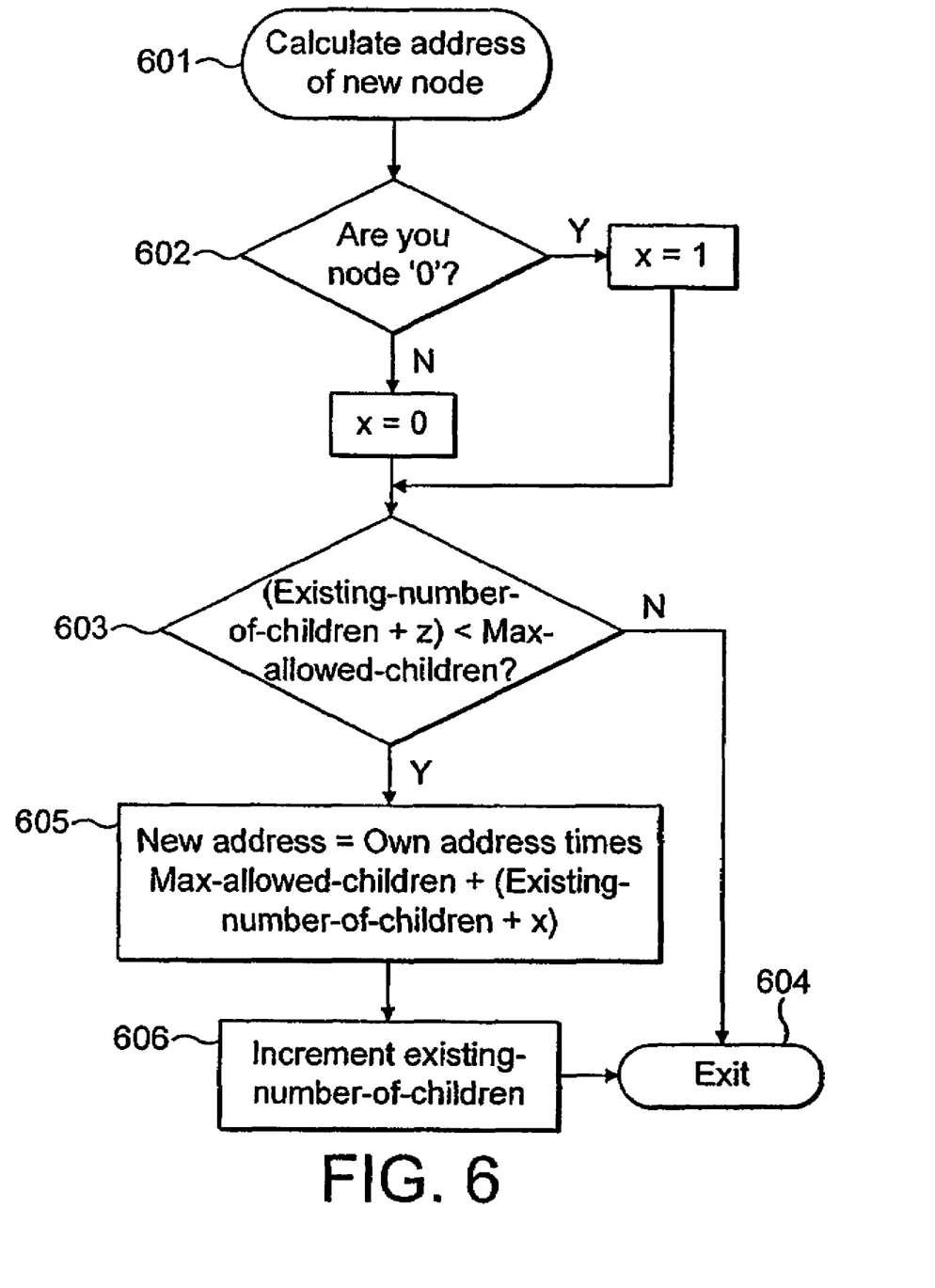
FIG. 6 shows the allocation of an address to a new node, in accordance with an embodiment of the invention.

FIG. 6 shows the allocation of an address to a new node, in accordance with an embodiment of the invention. This algorithm may be used to add a new node to the tree structure of FIG. 2, for example. First, in order to calculate 601 the address of a new node, it is determined 602 whether the node is node 0; if so, an address variable x is initialized to 1; otherwise, x is initialized to 0. Next, a comparison 603 is made. If the existing number of node children plus the value of x is greater than or equal to the maximum number of node children, the algorithm exits 604. Otherwise, the new address is set equal to the node's own address times the maximum allowed number of children plus the existing number of children plus x, at 605. The existing number of children is then incremented, 606, and the algorithm exits, 604.

In an embodiment according to the invention, data is stored at each node regarding both the node's immediate surroundings, and regarding those end-points in the network with whom the node is required to communicate. Regarding its immediate surroundings, each node stores information about each other node with which it has direct radio contact. It stores the number of nodes that it has so far "adopted" into the network, as well as the total number of neighbour nodes with which it has direct communication. For each neighbour node, this information includes:

1) The neighbour's identifier number, which permanently and uniquely identifies every node.

2) The dynamically allocated network address of that neighbour node.

3) The current 'code' for that neighbour. This is updated every timeslot from a maximal length pseudo-random bit sequence and is used to calculate which frequency any neighbour will be receiving on, in any timeslot.

4) The current clock-offset for that neighbour. This number is added to the native clock of the node when it wishes to transmit to any neighbour. This ensures that the transmission is synchronized to the receiving node's timeslots.

5) The last known quality of the link to that neighbour. This may be based upon radio frequency signal strength, or on the ratio of successfully transmitted packets to failed packets.

In an embodiment according to the invention, the end-points with which a node is required to communicate may be, for example, a sensor from which the node should expect to receive data, and respond as a result of receiving such data. For each end-point node, the information stored at a node is:

1) The end-point node's identifier number, which permanently and uniquely identifies every node.

2) The dynamically allocated network address of that end-point node.

3) The relationship it has with that end-point. For example, whether it should send data to that end-point as a result of an external event; or whether it should execute some external action as a result of receiving data from that end-point.

In one embodiment according to the invention, the wireless mesh network can be used to implement a building management system, such as a building lighting control system. The member nodes of the network can be reconfigured or maintained using a wirelessly enabled PDA or handheld device. A member node of the network can act as a gateway to any or all of: a PC or processor; a local area network, such as an Ethernet, 802.11, or HyperLAN network; or a wide area network, such as a TCP/IP, GSM/GPRS, or UMTS network; or to existing telecommunications infrastructure inside the building. Also, management interface software according to the invention can allow active management of the building management system, for example via the PDA/handheld, or via the gateway member node. The management interface software can also allow remote access to control the building management system, for example through the gateway node. Each node may comprise components selected from at least one of: (i) a generic ISM band transceiver and a low power microprocessor; (ii) a device conforming to the Bluetooth standard 802.15.1; (iii) a device conforming to the ZigBee standard 802.15.4; and (iv) a device conforming to the WiFi standard 802.11.

In an embodiment according to the invention, each member node of the wireless mesh network can be assigned a set of other members of the same network with which it will communicate via the optimum route. Each member of the network is able to communicate via the most direct route with any other member that it has been assigned to communicate with. There is no requirement for all messages to be routed via a central controller, nor is there any restriction on the ability of other members of the network to communicate simultaneously, as long as the various communications are separated by at least one of: time, space, and communications channel.

Furthermore, in accordance with an embodiment of the invention, member nodes can be grouped to operate en masse to an instruction from another member node. This allows whole floors or buildings to be illuminated with a single switch. Member nodes can also be members of multiple groups, allowing a plurality of behaviors, such as: in a multistory office, a single light fixture node may be a member of the stairwell group and a floor group, such that when the lights on the floor are turned on, the stairwell is lit also. In this way, groups can be "stacked," such that if the light in a single office cubicle is on, the light corridor to the exit is also lit, as is the stairwell to the ground floor.

A system according to an embodiment of the invention has a number of advantages. First, the function of each member node of the wireless mesh network is reconfigurable. The nodes can be instructed via the management interface software, mentioned above, to communicate with additional nodes, or a completely new set of member nodes. Second, the whole system can be monitored and maintained from a single control point. This allows, for example, notification of remote bulb failure; failure prediction of bulbs, nodes, switches, and sensors; the switching on and off of the entire system in the evening; switching between different operating modes, e.g. day, night, summer, winter modes; and allows advertising on a building front using office lights as "pixels" to form the advertising image. Third, planned maintenance can be performed, by which messages can be re-routed based upon traffic density such that batteries, which can provide power for the external device of all or some of the nodes, run out at around the same time. Fourth, the member nodes of the network can be instructed to work in collaboration to reduce energy costs. For example, a member node that is an occupancy sensor can inform another member node, which is a light fitting, to switch the light off if the room is empty. The network can also be controlled from the central management interface to switch off all unnecessary power use during the night, for example.

In an embodiment according to the invention, the network is initialized in three stages: tree formation, cross-branch discovery, and tree re-mapping. In the tree formation stage, when individual nodes are first activated, they have no knowledge of any other surrounding nodes. In this instance, they transmit requests to any other node that may hear them to join the network. However, unless a node is already a member of an established network, it is not authorized to respond to any such requests. The network is initialized from a designated node, which is authorized by a human controller to respond to any such requests that it may receive. In this way, the network is initialized from a central point, and the establishment of the network ripples out from that single member node. When a new node is welcomed to the network (i.e. its sign-on requests are answered) it is assigned a network address that is derived from the network address of the node that has welcomed it, for example using the algorithm of FIG. 6. This process quickly forms the network into a tree, where each node's network address is derived from the node above it in the tree, for example using the formula at step 605 of FIG. 6. Hence, any node can calculate how closely related it is to any other node in the network by comparing the two network addresses. Specifically, the number of generations by which the two nodes differ can be calculated by determining the number of times that the node address can be divided by the maximum allowed number of children before that number becomes less than one. Alternatively, in binary format, it is the number of times that the node address can be right shifted by the square-root of the maximum allowed number of children before it becomes zero (assuming that the maximum allowed number of children is a square number).

For example, take the node with address '5.' This node is the second child of node '1', which is the first child of node '0'. Therefore node '5' is a second generation node (being two generations from node '0'). To calculate this in reverse based on its network address, one would calculate:

[Address]/[Maximum Allowed Number of Children]=
5/4=1.25

[Result]/[Maximum Allowed Number of Children]=
1.25/4=0.3125

In this case, the network address (i.e. '5') had to be divided by the maximum allowed number of children twice before the result was less than one. Therefore, this device belongs to generation two in the tree structure.

Next, in the cross-branch discovery stage, according to an embodiment of the invention, the nodes continue to transmit discovery messages to locate any other nodes that are also already members of the network. Each node then populates a routing table with those other member nodes that it discovers and are most distantly related to itself; that is, those nodes whose network addresses are most different from its own.

In building the tree structure, in an embodiment according to the invention, the tree is first built with a connectivity in which the member of the n-th generation has m daughter members in the (n+1)-th generation. Consequently, a tree-like structure is generated in which an optimal routing can be deterministically traced, as described further below. Addition of cross-branches results in direct links between the n-th and (n±j)-th generation, where j>1, which results in a more degenerate routing topology that may consist of multiple routes that have different route properties, such as number of hops, power consumption, traffic density, time delay, and other properties. The tree re-mapping stage, according to an embodiment of the invention, consists of a number of network rules designed to result in a network performance that is optimized to a particular set of constraints, such as power consumption, shortest hops, and so on. The structure of the network after re-mapping results in a network address for each node that more closely reflects the topology of the entire network. In a particular re-mapping strategy, the cross-branches connect between the n-th generation and the (n+1)-th and (n−1)-th and n-th generations.

In accordance with an embodiment of the invention, since every member node of a network has a network address that is derived from the member node through which it joined the network (for example using the algorithm of FIG. 6), it can calculate which of its immediate neighbours is most closely related to any other member of the network. On this basis, if a node receives an instruction to initiate or forward a message to any unknown member of the network, it can make an optimum routing decision based upon which of its neighbours is most closely related to the destination node.

If a member node loses access to any preferable routing options, it may resort to initiating a broadcast route discovery request, in accordance with an embodiment of the invention. In this instance, it will send a routing request to each of its neighbours enquiring whether they know of a route towards the final destination. This message is retransmitted by all who receive it, unless any node that receives it has access to a route to the specified destination. In this case, it will reply to the node from which the broadcast originated, giving the distance (in 'hops') from it to the specified destination node. The originating node is able to compare all of the responses that it receives, and determine the optimal route to reach the specified destination.

In a building management environment, there are many applications in which it is desirable to employ a totally wireless member node, which uses battery power rather than mains power. It is also highly desirable for the battery life of any battery-powered device to approach ten years, to avoid the need for frequent battery maintenance. In order to achieve this aim, the battery-powered member nodes must enter a low-power 'sleep' state as much as possible. However, while in the 'sleep' state, the nodes will not be able to play any role in the network, since they will be neither transmitting nor receiving messages. In order to overcome this problem, in accordance with an embodiment of the invention, mains-powered members of the network that are near to a battery-powered member are assigned to 'buddy' with the battery-powered node. The mains-powered member keeps track of the cycle of sleep for the battery-powered member with which it is paired, and buffers the flow of communications between the battery-powered node and the rest of the network. The mains-powered member can also make urgent decisions for the buddy node if the decision cannot wait until the battery-powered node is next awake. In this way, the mains-powered nodes do the majority of the work in network maintenance and message routing, leaving the battery-powered members to conserve their batteries.

In another embodiment according to the invention, the time perception of individual nodes of the network is kept synchronized, for example by using a central node as the time standard for the entire network, or by having each node maintain a record of the time offset between all of its nearest neighbor nodes. The latter method avoids the need for a central beacon signal, thereby removing the network's dependence on a single network node for time synchronization.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

What is claimed is:

1. A method of operating a wireless mesh network including a plurality of nodes, each node comprising a processor, the method comprising:
    seeding the network from a first node;
    allocating a network address to each member node of the network to form a tree-like structure of nodes, such that the network address is reversibly derived from the network address of the member node from which it is derived in the tree-like structure; and
    mapping out cross-branch network connections between nodes that are determined not to be immediate neighbour nodes according to the addresses of the tree-like structure,
    wherein cross-branch network connections are formed by:
    (1) each node of the network periodically transmitting a discovery message; and (ii) when a second member node receives the discovery message, forming a cross-branch network connection between the second member node and a node that sent the discovery message.

2. The method according to claim 1, wherein each node of the network responds to the same predetermined maximum number of requests to join the network from other potential member nodes.

3. The method according to claim 1, wherein each network address for each new node of the network is derived from a network address of a member node that responds to the new node's request to join the network.

4. The method according to any one of claims 1 through 3, further comprising re-allocating the network addresses of the nodes of the network such that no node of the network has a network connection with another node of the network that is in a generation of the tree-like structure that differs by more than one generation.

5. The method according to claim 4, further comprising determining a minimum number of nodes through which a message must be passed to be transferred from a source node to a destination node.

6. The method according to claim 5, wherein the method comprises:
    determining a minimum number of nodes through which a message must be passed to be transferred from each neighbouring node of a source node to a destination node; and
    transferring the message from the source node to a neighbour node that has the smallest such minimum number of nodes.

7. The method according to claim 1, wherein the network comprises both battery-powered and mains-powered nodes, and wherein the method further comprises:
    operating at least one battery-powered node in a dormant state for at least a portion of time; and
    using a mains-powered node, associated with the at least one battery-powered node, to hold incoming information directed to the associated battery-powered node, until the battery-powered device becomes active again.

8. The method according to claim 7, further comprising preferentially routing messages via the mains-powered nodes.

9. The method according to claim 1, wherein a single synchronization node of the network periodically transmits time synchronization messages throughout the network.

10. The method according to claim 1, wherein each node of the network maintains a record of a time offset between its own time standard and that of each of its neighbouring nodes.

11. The method according to claim 1, further comprising connecting at least one member node of the network to a computer device using a management interface.

12. The method according to claim 11, wherein the computer device gathers information about the status of the network using the management interface.

13. The method according to claim 11, wherein the computer device issues instructions to at least one node of the network using the management interface.

14. The method according to claim 13, further comprising issuing instructions from the computer device to at least one node of the network, using the management interface, to group at least two nodes of the network, such that the grouped nodes store network addresses of fellow grouped nodes, and transmit a message to the fellow grouped nodes upon receipt of an external stimulus.

15. The method according to claim 14, wherein at least one node of the grouped nodes is capable of re-transmitting a message to all other member nodes of the grouped nodes.

16. The method according to claim 1, wherein at least one node of the network communicates with a device that is capable of converting messages from the network into a form suitable for transmission via an alternative protocol.

17. The method according to claim 16, wherein the alternative protocol is at least one of: Ethernet, the 802.11 Standard, HyperLAN, TCP/IP, GSM, GPRS, EDGE, or UMTS.

18. The method according to claim 1, wherein each node of the network comprises a wireless transceiver, a microprocessor, and an external device.

19. The method according to claim 18, wherein the external device comprises a sensor, an actuator, or a general computing device.

20. The method according to claim 18, wherein the external device comprises a building lighting device.

21. The method according to claim 18, wherein each node comprises components selected from at least one of:

(i) a generic ISM band transceiver and a low power microprocessor;
(ii) a device conforming to the Bluetooth standard 802.15.1
(iii) a device conforming to the ZigBee standard 802.15.4; and
(iv) a device conforming to the WiFi standard 802.11.

22. A wireless network, the network comprising:

a plurality of member nodes arranged in a tree-like structure seeded from a first node, wherein each member node is allocated a network address that is reversibly derived from the network address of the member node from which it is derived in the tree-like structure; and at least one cross-branch connection between nodes of the network that are not immediate neighbour nodes according to the network addresses of the tree-like structure, wherein cross-branch network connections are formed by: (1) each node of the network periodically transmitting a discovery message; and (ii) when a second member node receives the discovery message, forming a cross-branch network connection between the second member node and a node that sent the discovery message.

* * * * *